US007518993B1

(12) United States Patent
Dennis

(10) Patent No.: US 7,518,993 B1
(45) Date of Patent: Apr. 14, 2009

(54) PRIORITIZING RESOURCE UTILIZATION IN MULTI-THREAD COMPUTING SYSTEM

(75) Inventor: Jack B. Dennis, Belmont, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1402 days.

(21) Appl. No.: 09/715,778

(22) Filed: Nov. 17, 2000

Related U.S. Application Data

(60) Provisional application No. 60/166,685, filed on Nov. 19, 1999.

(51) Int. Cl.
*H04L 12/16* (2006.01)

(52) U.S. Cl. .................... 370/235; 712/205; 718/102

(58) Field of Classification Search ............. 370/235, 370/230, 230.1, 231, 237; 712/205, 214; 718/102, 103, 104, 106, 107
See application file for complete search history.

(56) References Cited

U.S. PATENT DOCUMENTS

| 5,155,858 | A | * | 10/1992 | DeBruler et al. | 718/105 |
|---|---|---|---|---|---|
| 5,287,508 | A | * | 2/1994 | Hejna et al. | 718/102 |
| 5,325,526 | A | * | 6/1994 | Cameron et al. | 718/102 |
| 5,349,656 | A | * | 9/1994 | Kaneko et al. | 718/102 |
| 5,428,789 | A | * | 6/1995 | Waldron, III | 718/103 |
| 5,524,250 | A | * | 6/1996 | Chesson et al. | 712/228 |
| 5,586,318 | A | * | 12/1996 | Toutonghi | 718/107 |
| 5,752,031 | A | * | 5/1998 | Cutler et al. | 718/103 |
| 5,799,182 | A | * | 8/1998 | Gravenstein et al. | 712/245 |
| 5,968,167 | A | * | 10/1999 | Whittaker et al. | 712/225 |
| 6,038,604 | A | * | 3/2000 | Bender et al. | 709/233 |
| 6,070,189 | A | * | 5/2000 | Bender et al. | 709/224 |
| 6,108,683 | A | * | 8/2000 | Kamada et al. | 718/103 |
| 6,212,544 | B1 | * | 4/2001 | Borkenhagen et al. | 718/103 |
| 6,272,517 | B1 | * | 8/2001 | Yue et al. | 718/102 |
| 6,434,590 | B1 | * | 8/2002 | Blelloch et al. | 718/102 |
| 6,526,452 | B1 | * | 2/2003 | Petersen et al. | 709/251 |
| 6,567,839 | B1 | * | 5/2003 | Borkenhagen et al. | 718/103 |
| 6,587,865 | B1 | * | 7/2003 | Kimbrel et al. | 718/104 |
| 6,651,158 | B2 | * | 11/2003 | Burns et al. | 712/205 |
| 6,665,755 | B2 | * | 12/2003 | Modelski et al. | 710/100 |
| 6,779,182 | B1 | * | 8/2004 | Zolnowsky | 718/103 |
| 6,931,639 | B1 | * | 8/2005 | Eickemeyer | 718/104 |
| 7,010,669 | B2 | * | 3/2006 | Burns et al. | 712/205 |
| 7,043,728 | B1 | * | 5/2006 | Galpin | 718/102 |
| 7,051,329 | B1 | * | 5/2006 | Boggs et al. | 718/104 |
| 7,219,185 | B2 | * | 5/2007 | Luick | 711/5 |
| 2003/0158885 | A1 | * | 8/2003 | Sager | 709/108 |

OTHER PUBLICATIONS

Tullsen et al., "Simultaneous Multithreading: Maximizing On-Chip Parallelism," Proc. 22nd Annual International Symposium on Computer Architecture, 1995, 392-403.

* cited by examiner

*Primary Examiner*—Chi H. Pham
*Assistant Examiner*—Kevin Mew
(74) *Attorney, Agent, or Firm*—Sterne, Kessler, Goldstein & Fox PLLC

(57) ABSTRACT

One embodiment of the present invention prioritizes resource utilization in a multi-thread processor. A priority register stores thread information for P threads. The thread information includes P priority codes corresponding to the P threads, at least one of the P threads requesting use of at least one resource unit. A priority selector generates assignment signal to assign the at least one resource unit to the at least one of the P threads according to the P priority codes.

30 Claims, 7 Drawing Sheets

PRIORITIZING RESOURCE UTILIZATION IN MULTI-THREAD COMPUTING SYSTEM

RELATED APPLICATION

This application claims the benefit of U.S. Provisional Application No. 60/166,685, titled "Priority Mechanism for a Multithread Computer" filed on Nov. 19, 1999.

BACKGROUND

1. Field of the Invention

This invention relates to computer architecture. In particular, the invention relates to multi-thread computers.

2. Description of Related Art

Demand in high speed data transmission has given rise to many large bandwidth network protocols and standards. For example, the Synchronous Optical Network (SONET) has a number of standards used in Wide Area Network (WAN) with speeds ranging from a few megabits per second (Mbps) to several gigabits per second (Gbps). Popular standards include T1 (1.5 Mbps), T3 (45 Mbps), OC-3c (155 Mbps), OC-12c (622 Mbps), OC-48c (2.5 Gbps), OC-192c (10 Gbps), OC-768c (40 Gbps), etc.

In network applications, the requirements for cell processing and packet processing functions at line rates for broadband communications switches and routers have become increasingly difficult. Multiple processors are used in an arrangement that supports coordinated access to shared data to achieve the required level of performance.

A high performance processor typically has a number of resources associated with program execution. Examples of these resources include memory interface units, functional units, and instruction fetch units. Conflicts arise when use of resources is requested by several entities for the same operation cycle.

To complete the tasks involved in processing cells or packets in real time for communication applications, a processor should be able to apply its resources preferentially to the most pressing tasks.

SUMMARY

The present invention is a method and apparatus to prioritize resource utilization in a multi-thread processor. A priority register stores thread information for P threads. The thread information includes P priority codes corresponding to the P threads, at least one of the P threads requesting use of at least one resource unit. A priority selector generates assignment signal to assign the at least one resource unit to the at least one of the P threads according to the P priority codes.

BRIEF DESCRIPTION OF THE DRAWINGS

The features and advantages of the present invention will become apparent from the following detailed description of the present invention in which.

DESCRIPTION

The present invention is a method and apparatus to prioritize resource utilization in a multi-thread processor. A priority register stores thread information for P threads. The thread information includes P priority codes corresponding to the P threads, at least one of the P threads requesting use of at least one resource unit. A priority selector generates assignment signal to assign the at least one resource unit to the at least one of the P threads according to the P priority codes.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
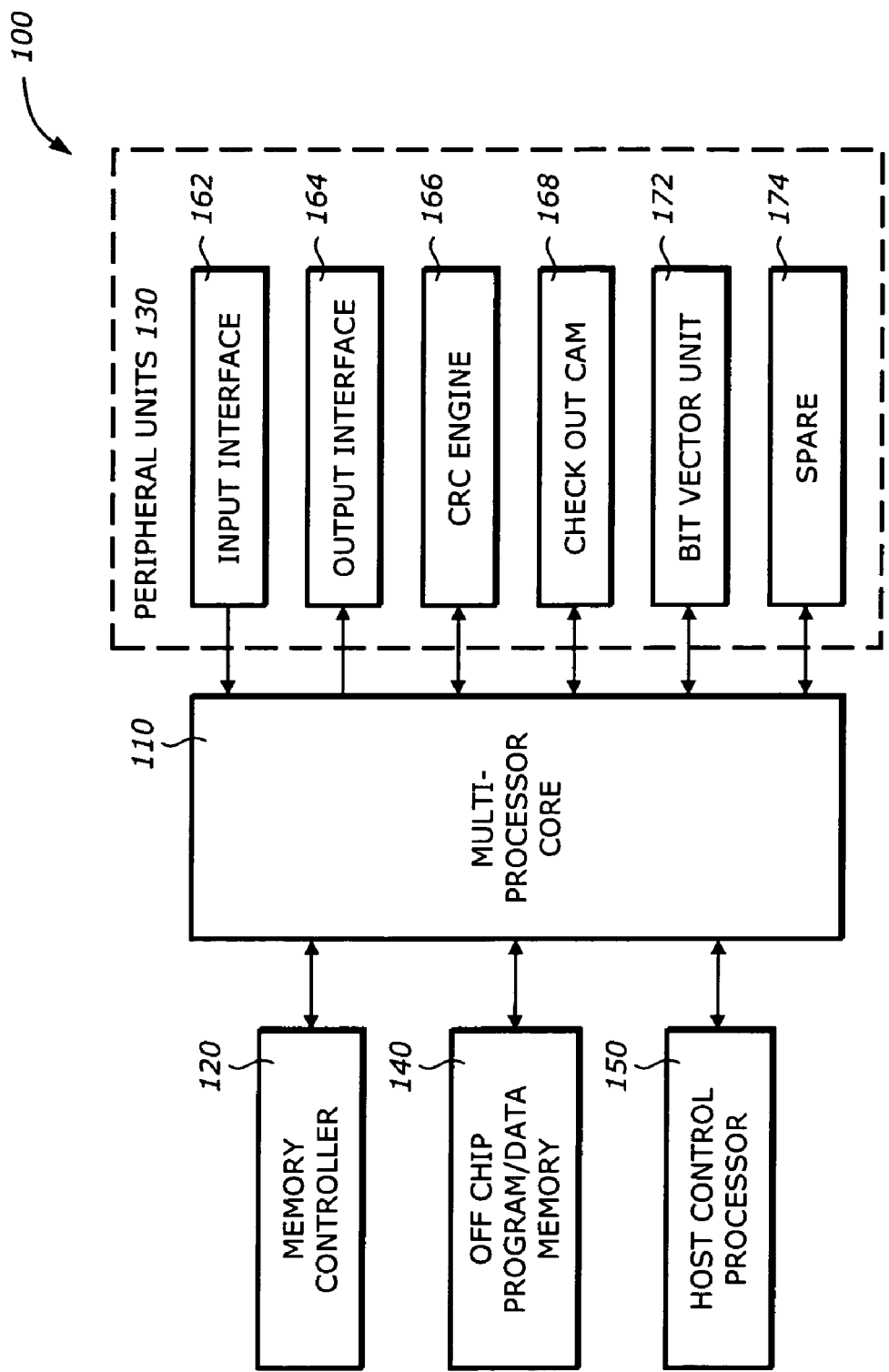
FIG. 1 is a diagram illustrating a system in which one embodiment of the invention can be practiced.

FIG. 1 is a diagram illustrating a system 100 in which one embodiment of the invention can be practiced. The system 100 includes a multiprocessor core 110, a memory controller 120, peripheral units 130, an off-chip program/data memory 140, and a host control processor 150.

The multiprocessor core 110 is a high-performance multi-thread computing subsystem capable of performing all functions related to network operations. These network operations may include adjusting transmission rates, handling special cells and packets used to implement flow control protocols on an individual connection basis, and supporting Asynchronous Transfer Mode (ATM) traffic management for Available Bit Rate (ABR), Variable Bit Rate (VBR), and Unspecified Bit Rate (UBR) connections. The memory controller 120 provides access to additional memory devices and includes circuitry to interface to various memory types including dynamic random access memory (DRAM) and static random access memory (SRAM). The peripheral units 130 include a number of peripheral or input/output (I/O) units for peripheral or I/O operations. The peripheral units 130 include an input interface 162, and output interface 164, a cyclic redundancy code (CRC) engine 166, a check-out content addressable memory (CAM) 168, a bit vector unit 172, and a spare 174. The input and output interfaces 162 and 164 provide interfaces to inbound and outbound network traffics, respectively. These interfaces may include line and switch/system interfaces that support industry standards, including multi-phy features such as Universal Test and Operations PHY Interface for ATM (UTOPIA). The CRC engine 166 supports segmentation and re-assembly for ATM Adaptation Layer Type 5 (AAL5) transmission of packets over ATM connections. The check-out CAM 168 is an associative memory unit that supports the maintenance of several connection records in the on-chip memory for the duration of cell processing for those connections. The bit vector unit 172 supports round-robin scheduling algorithms at the OC-48 line rate.

The off-chip program/data memory 140 includes memory devices that store programs or data in addition to the on-chip programs and data stored in the multiprocessor core 110. The host control processor 150 is a processor that performs the general control functions in the network. These functions may include connection set-up, parameter adjustment, operation monitoring, program loading and debugging support.

Figure 2:
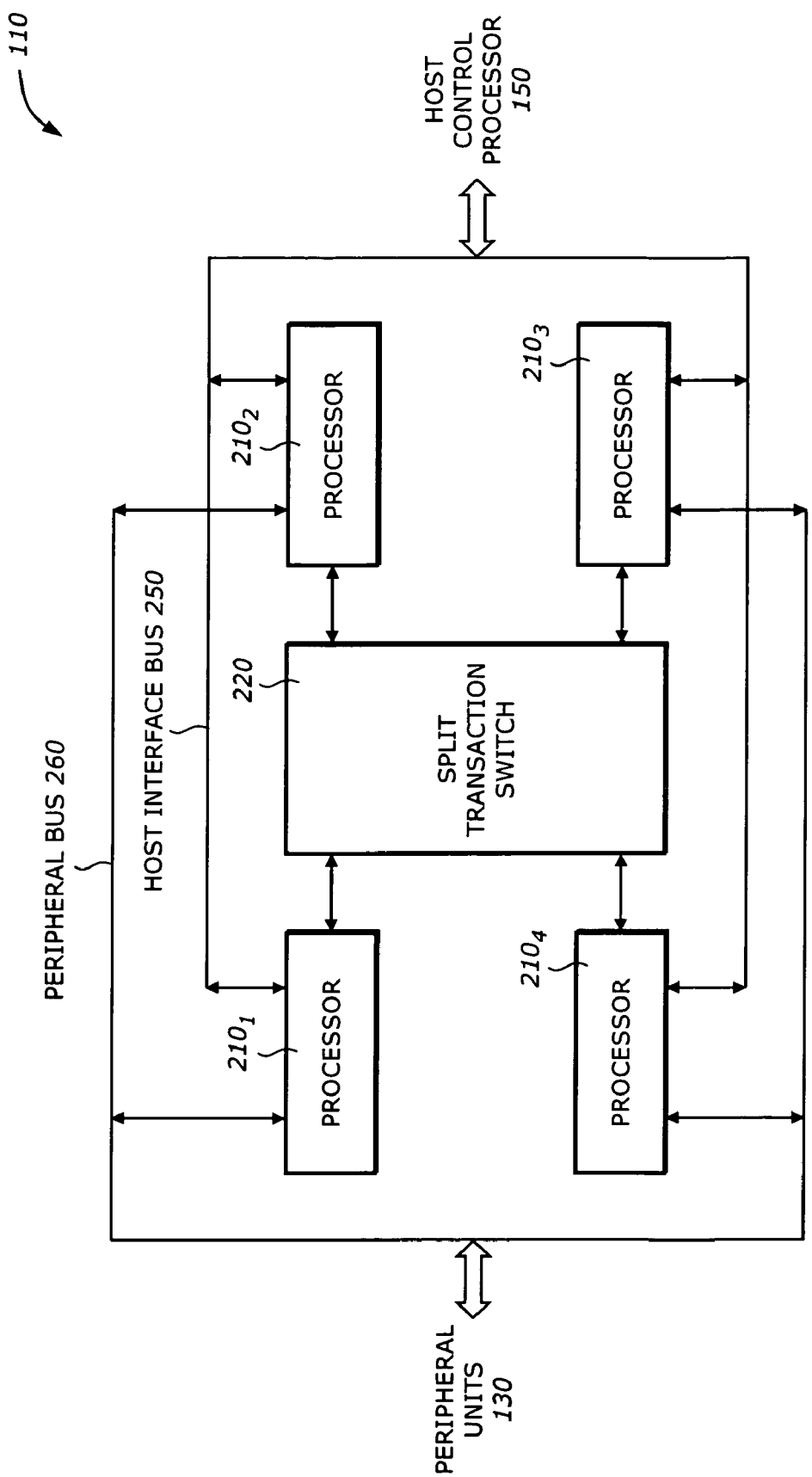
FIG. 2 is a diagram illustrating a multiprocessor core shown in FIG. 1 according to one embodiment of the invention.

FIG. 2 is a diagram illustrating the multiprocessor core 110 shown in FIG. 1 according to one embodiment of the invention. The multiprocessor core 110 includes four multi-thread processors 210₁ to 210₄, a split transaction switch 220, a host interface bus 250, and a peripheral bus 260. It is noted that the use of four processors is for illustrative purposes only. As is known to one skilled in the art, any reasonable number of processors can be used.

The four multi-thread processors 210₁ to 210₄ are essentially the same. Each of the processors 210₁ to 210₄ has local program and data memories for N-bit words of instructions and data, respectively. In one embodiment, N=32. The split transaction switch 210 permits each of the processors to access the data words held in any of the other three data memories with a small additional access time.

The host interface bus 250 allows the any of the four processors 210₁ to 210₄ to communicate with the host control processor 150 (FIG. 1). This includes passing parameters, loading program and data, and reporting status. The peripheral bus 260 allows any one of the peripheral units 130 to communicate with any of the processors 210₁ to 210₄. Some peripheral units may have direct memory access (DMA) channels to the local data memories of any one of the processors 210₁ to 210₄. In one embodiment, each of these channels supports burst transfer of 32-bit data at 100 MHz clock rate, equivalent to greater than the OC-48 speed.

Figure 3:
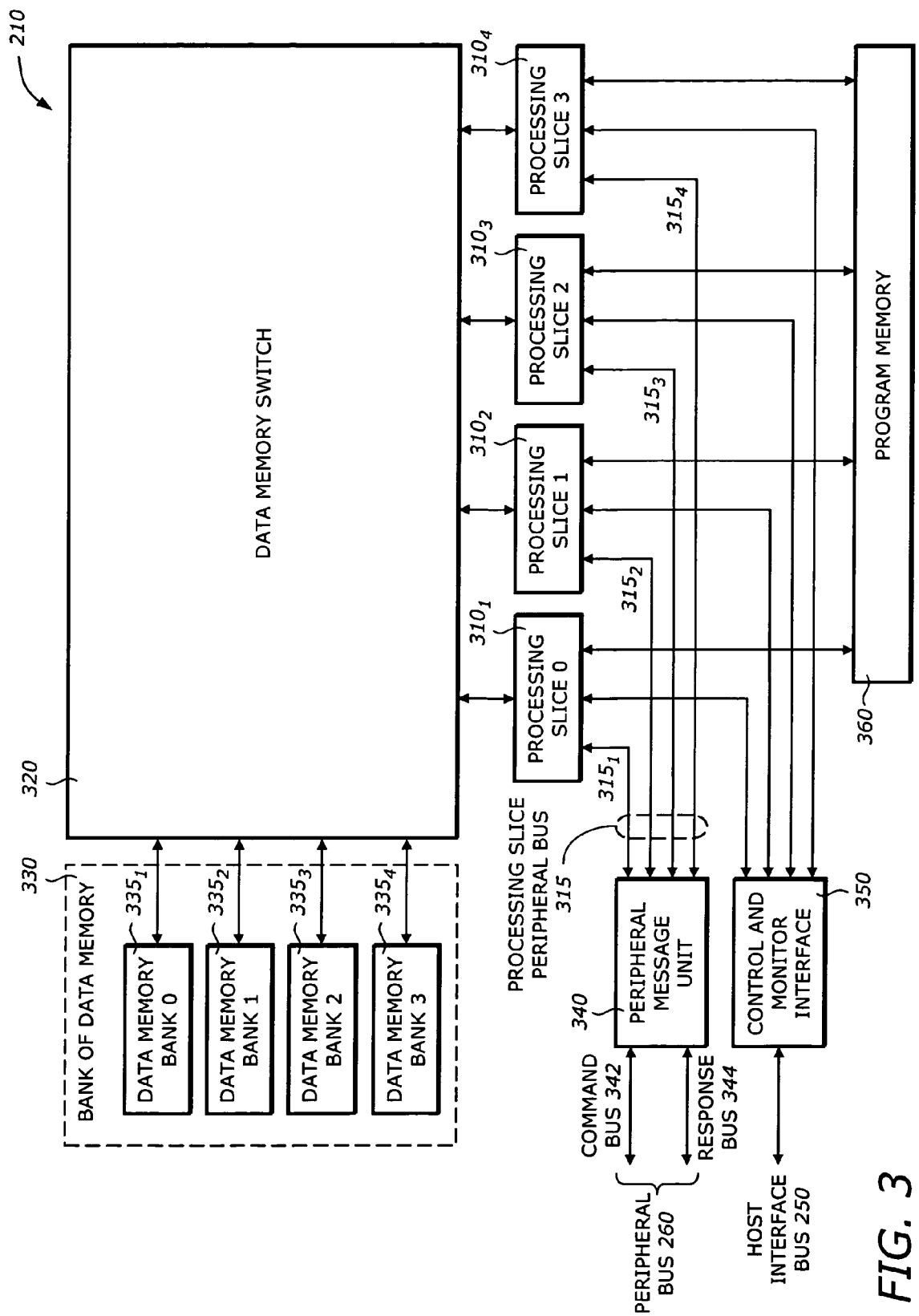
FIG. 3 is a diagram illustrating a multi-thread processor shown in FIG. 2 according to one embodiment of the invention.

FIG. 3 is a diagram illustrating the multi-thread processor 210 shown in FIG. 2 according to one embodiment of the invention. The multi-thread processor 210 includes four processing slices (PS's) 310₁ to 310₄, a data memory switch 320, banks of data memory 330, a peripheral message unit 340, a control and monitor interface 350, and a program memory 360. It is noted that the use of four PS's is for illustrative purposes only. As is known by one skilled in the art, any number of PS's can be used.

The multi-thread processor 210 is a data and/or information processing machine that supports the simultaneous execution of several programs, each program being represented by a sequence of instructions. A thread is a sequence of instructions that may be a program, or a part of a program. The multi-thread processor 210 may have one or more instruction execution resources such as arithmetic logic units, branch units, memory interface units, and input-output interface units. In any operation cycle of the multi-thread processor 210, any instruction execution resource may operate to carry out execution of an instruction in any thread. Any one instruction resource unit may participate in the execution of instructions of different threads in successive cycles of processor operation. To support this mode of operation, the multi-thread processor 210 may have a separate hardware register, referred to as the program counter, for each thread that indicates the position or address of the next instruction to be executed within the thread. A multi-thread multiprocessor is a data and/or information processing system composed of several multi-thread processors.

Each of the PS's 310₁ to 310₄ contains a program sequencer and execution units to perform instruction fetch, decode, dispatch and execution for four threads. Each of the PS's operates by interleaving the execution of instructions from the four threads, including the ability to execute several instructions concurrently in the same clock cycle. The data memory switch 320 allows any of the four PS's 310₁ to 310₄ to access any data memory bank in the banks of data memories 330. The banks of memories 330 include four banks 335₁ to 335₄: data memory banks 0 to 3. Each of the data memory banks 335₁ to 335₄ stores data to be used or accessed by any of the PS's 310₁ to 310₄. In addition, each of the data memory banks 335₁ to 335₄ has an interface to the DMA bus to support DMA transfers between the peripherals and data memory banks. The banks 335₁ to 335₄ are interleaved on the low-order address bits. In this way, DMA transfers to and from several of the peripheral units 130 can proceed simultaneously with thread execution without interference.

The four PS's 310₁ to 310₄ are connected to the peripheral message unit 340 via four PS buses 315₁ to 315₄, respectively. The peripheral message unit 340 is a distribution or switching location to switch the peripheral bus 260 to each of the PS buses 315₁ to 315₄. The peripheral message unit 340 is interfaced to the peripheral bus 260 via a command bus 342 and a response bus 344. The command bus 342 and the response bus 344 may be combined into one single bi-directional bus. Appropriate signaling scheme or handshaking protocol is used to determine if the information is a command message or the response message.

When a thread in any of the four PS's 310₁ to 310₄ executes a wait or no_wait instruction for a peripheral operation, a command message is sent from the issuing PS to the command bus 342. The command message specifies the peripheral unit where the peripheral operation is to be performed by including the address of the peripheral unit. All peripheral units connected to the peripheral bus 260 have an address decoder to decode the peripheral unit address in the command message. When a peripheral unit recognizes that it is the intended peripheral unit for the peripheral operation, it will decode the command code contained in the command message and then carry out the operation. If the command message is a wait message instruction, the issuing thread is stalled for an interval during which the responding peripheral unit carries out the peripheral operation. During this interval, the resources associated with the issuing thread are available to other threads in the issuing slice. In this way, high resource utilization can be achieved. If it is a no_wait instruction, the issuing thread continues executing its sequence without waiting for the peripheral operation to be completed. The issuing thread may or may not need a response from the peripheral unit.

The control and monitor interface 350 permits the host control processor 150 to interact with any one of the four PS's 310₁ to 310₄ through the host interface bus 350 to perform control and monitoring functions. The program memory 360 stores program instructions to be used by any one of the threads in any one of the four PS's 310₁ to 310₄. The program memory 360 supports simultaneous fetches of four instruction words in each clock cycle.

Figure 4:
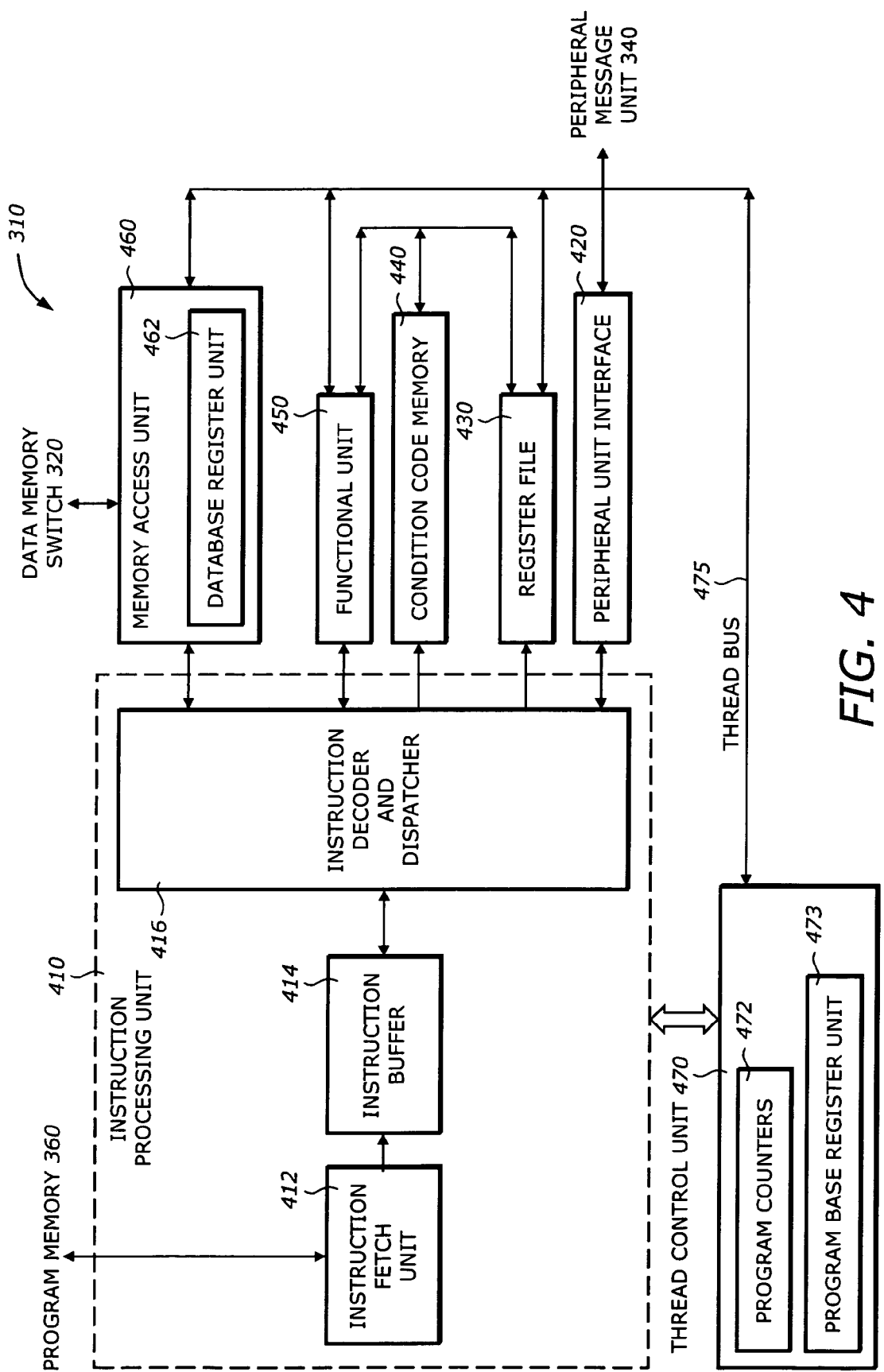
FIG. 4 is a diagram illustrating a processing slice shown in FIG. 3 according to one embodiment of the invention.

FIG. 4 is a diagram illustrating the processing slice 310 shown in FIG. 3 according to one embodiment of the invention. The processing slice 310 includes an instruction processing unit 410, a peripheral unit interface 420, a register file 430, a condition code memory 440, a functional unit 450, a memory access unit 460, and a thread control unit 470. The processing slice 310 is configured to have four threads. The use of four threads is for illustrative purposes only. As is known by one skilled in the art, any number of threads can be used.

The instruction processing unit 410 processes instructions fetched from the program memory 360. The instruction processing unit 410 includes an instruction fetch unit 412, an instruction buffer 414, and an instruction decoder and dispatcher 416. The instruction fetch unit 412 fetches the instructions from the program memory 360 using a plurality of program counters. Each program counter corresponds to each of the threads. The instruction buffer 414 holds the fetched instructions waiting for execution for any of the four threads. The instruction decoder and dispatcher 416 decodes the instructions and dispatches the decoded instructions to the peripheral unit 420, the register file 430, the condition code memory 440, the functional unit 450, or the memory access unit 460 as appropriate.

The thread control unit 470 manages initiation and termination of at least one of the four threads. The thread control unit 470 includes program counters 472 and a program (or code) base register unit 473 containing program base addresses corresponding to the threads. Execution of a computation may start from a single thread, executing the main function of the program. A thread may initiate execution of another thread by means of a start instruction. The new thread executes in the same function context as the given thread. In other words, it uses the same data and code base register contents. A thread runs until it encounters a peripheral wait, or until it reaches a quit instruction.

The peripheral unit interface 420 is connected to the instruction processing unit 410 and the peripheral message unit 340 to transfer the peripheral information between the peripheral units 130 (FIG. 1) and the instruction processing unit 410. The peripheral operation may be an input or an output operation. In one embodiment, an input or output operation is initiated by a message instruction that causes a command message to be transferred to a specified peripheral unit over the peripheral bus. The message instruction may be marked wait or no_wait. If the message instruction is marked wait, it is expected that the peripheral unit will return a response message; the processing slice that issued the message-wait instruction will execute the following instructions of that thread only when the response message has been received over the peripheral bus.

In a peripheral operation, a command message includes a content part that contains data words from data registers specified in the message instruction. If a response message is returned, it contains one or more result phrases, each specifying a data word and a data register identifier; the slice puts each data word in the specified data register, and continues execution of the thread after processing the last result phrase.

The register file 430 has four sets of data registers. Each of the four sets of data registers corresponds to each of the four threads. The data registers store data or temporary items used by the threads. Peripheral operations may reference the data registers in the command or response message.

The condition code memory 440 stores four condition codes. Each of the condition codes corresponds to each of the four threads. The condition code includes condition bits that represent the conditions generated by the functional unit 450. These condition bits include overflow, greater_than, equal, less_than conditions. The condition bits are set according to the type of the instruction being executed. For example, the compare instructions sets the greater_than, equal, and less than condition bits and clears the overflow condition bit.

The functional unit 450 performs an operation specified in the dispatched instruction. The functional unit 450 performs all operations of the instruction set that manipulate values in the data registers. These operations include arithmetic and logical register operations, shift and selected bit operations. The operation performed by the functional unit 450 is determined by a decoded opcode value passed from the instruction decoder and dispatcher 416. The functional unit 450 has connections to the condition code memory 440 to set a thread's condition code according to the outcome of an arithmetic operation or comparison.

The memory access unit 460 provides for read and write accesses to any of the four data memory banks $315_1$ to $315_4$ via the data memory switch 320 (FIG. 3). The memory access unit 460 has a base register unit 462 having four base registers to receive the base address used in address formation and for saving and restoring the base registers for the call and return instructions. Each of the four data base registers corresponds to each of the four threads.

In one alternative embodiment of the invention, the instruction processing unit 410 may include M program base registers. Each of the M program base registers is associated with each of the M threads. The contents of a base register are added to the contents of the corresponding program counter to determine the location in the program memory from which the next instruction for the corresponding thread is to be fetched. An advantage of this scheme is that the branch target specified in the instruction that transfers control may be represented in fewer bits for local transfers.

In one alternative embodiment of the invention, the memory access unit 460 may include a data base register unit 462 having M data base registers 462. Each of the M data base registers is associated with each of the M threads. The contents of the appropriate base register are added to the corresponding program counter to form the effective address for selected instructions. This permits offset addressing to be used, leading to more compact programs.

Figure 5:
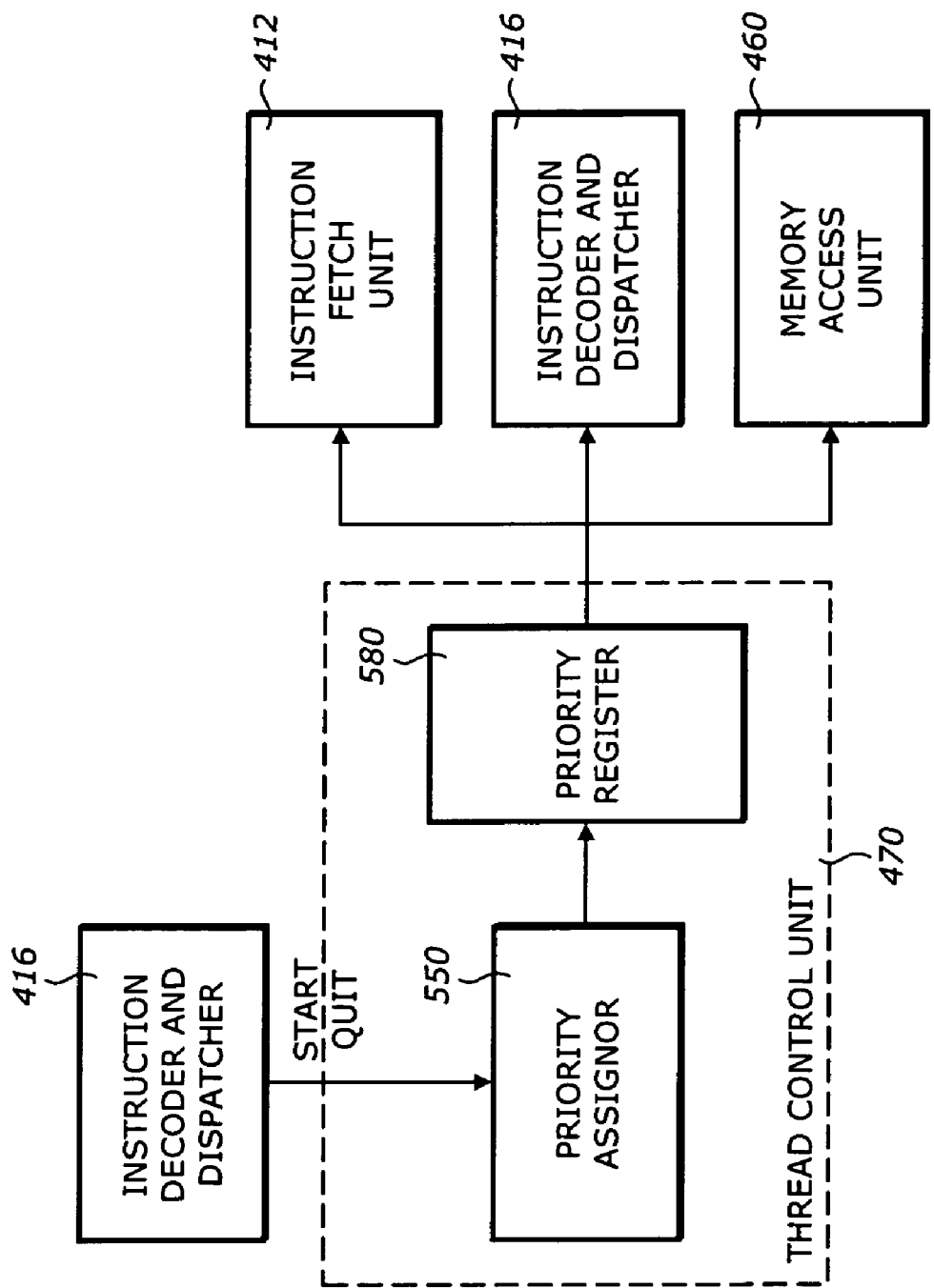
FIG. 5 is a diagram illustrating a thread control unit shown in FIG. 4 according to one embodiment of the invention.

FIG. 5 is a diagram illustrating the thread control unit 470 shown in FIG. 4 according to one embodiment of the invention. The thread control unit (TCU) 470 includes a priority register 580 and a priority assignor 550.

The priority register 580 holds priority codes and active flags in correspondence with threads 0 through P-1, and makes these codes available to priority selectors located in resource applying units such as the instruction fetch unit 412, the instruction decoder and dispatcher 416, and the memory access unit 460. The resource unit may also be an instruction buffer, a memory locking unit, a load unit, a store unit, and a peripheral unit interface.

The priority assignor 550 sets priority codes in the priority register 580 in response to start instructions presented to the priority assignor 550 by the instruction decoder and dispatcher 416. Execution of a start instruction sets the priority code of the newly activated thread to the priority level specified by the instruction, and sets the active flag. Execution of a quit instruction resets the active flag so the thread is no longer able to make requests for resource usage.

In an alternative embodiment, the priority assignor 550 may set the priority codes in the priority register 580 according to some static pre-assignment of priority levels. The priority assignor 550 may also alter the priority levels of threads based on measurements of program behavior or other conditions that could influence the ability of a processing system to meet real-time deadlines.

Figure 6:
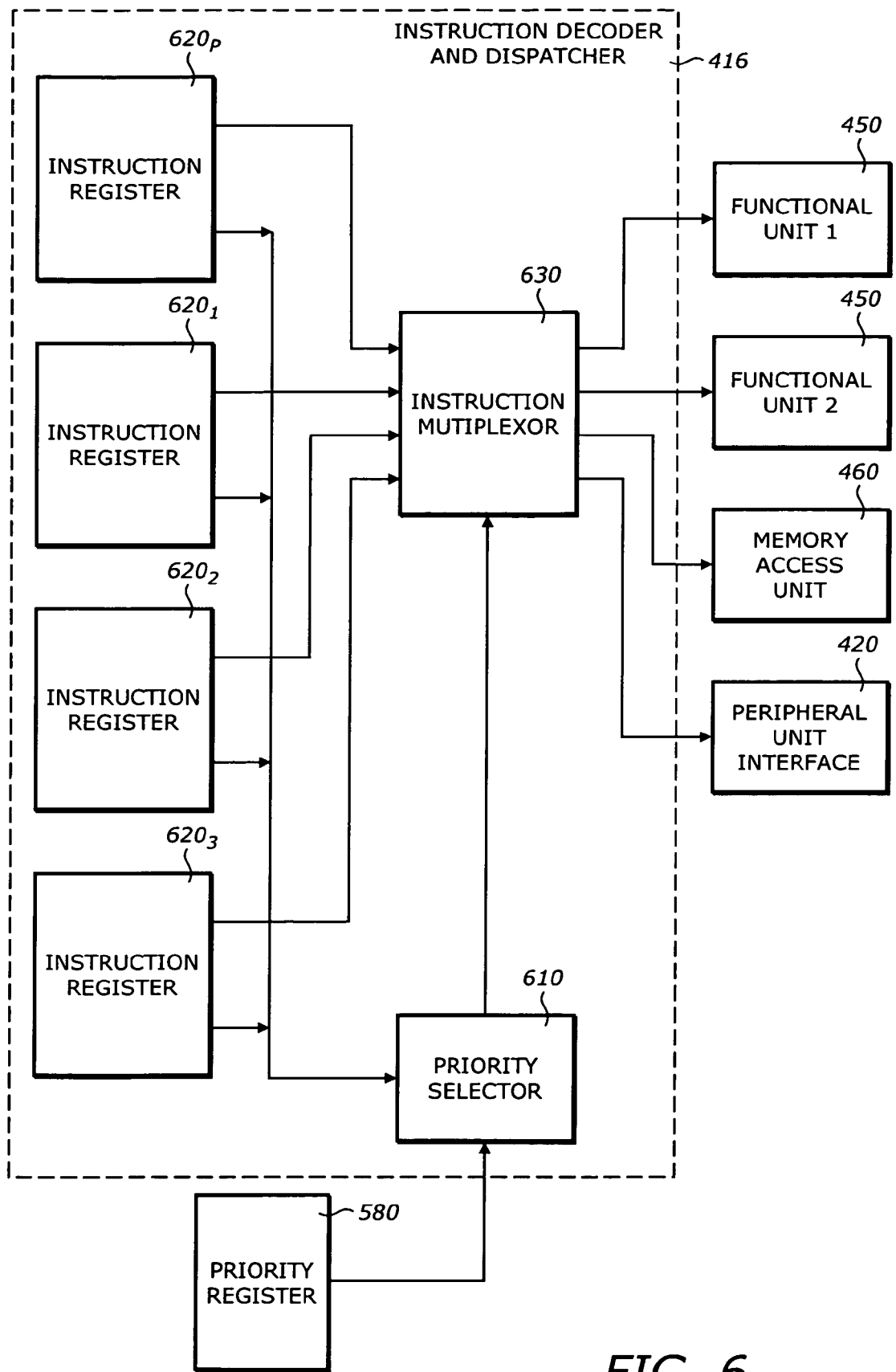
FIG. 6 is a diagram illustrating use of a priority selector in the instruction decoder and dispatcher according to one embodiment of the invention.

FIG. 6 is a diagram illustrating use of a priority selector 610 in the instruction decoder and dispatcher 416 according to one embodiment of the invention. The instruction decoder and dispatcher 416 includes four instruction registers $620_0$ to $620_3$, an instruction multiplexer 630 and a priority selector 610. The use of four instruction registers is for illustrative purposes only. As is known by one skilled in the art, any number of instruction registers can be used.

Each of the instruction registers $620_0$ to $620_3$ contains instruction code for the corresponding thread and has information to indicate presence of a request, the identifier of the thread making the request, and resource specifier that specifies the resource(s) (e.g., functional units, memory access unit) needed on the next machine cycle to execute (or start execution of) the instruction held in the instruction register, The priority selector 610 is a combinational logic circuit that uses its input signals to generate resource assignment signals that indicate for each thread whether it is permitted to use the requested resources during the next machine cycle. The input signals to the priority selector 610 include the information from the instruction registers $620_0$ to $620_3$ and the priority code for each thread from the priority register 580. These assignment signals control the instruction multiplexer 630 which passes the selected instructions to the functional units 450, the memory access unit 460, and the peripheral unit interface 420, or other appropriate resource unit. For any clock cycle, several threads may be assigned resources. The highest priority thread is considered first, then the remaining unassigned resources are made available for the thread having the next highest priority, etc.

The priority register 580, the priority assignor 550, the priority selector 610, the instruction multiplexer 630, or any combination thereof, form a resource prioritizer to assign resource units to threads requesting use of resource. The resource prioritizer may be located in any convenient location in the processor slice. The resource prioritizer may be implemented by hardware or software or any combination of hardware and software.

Figure 7:
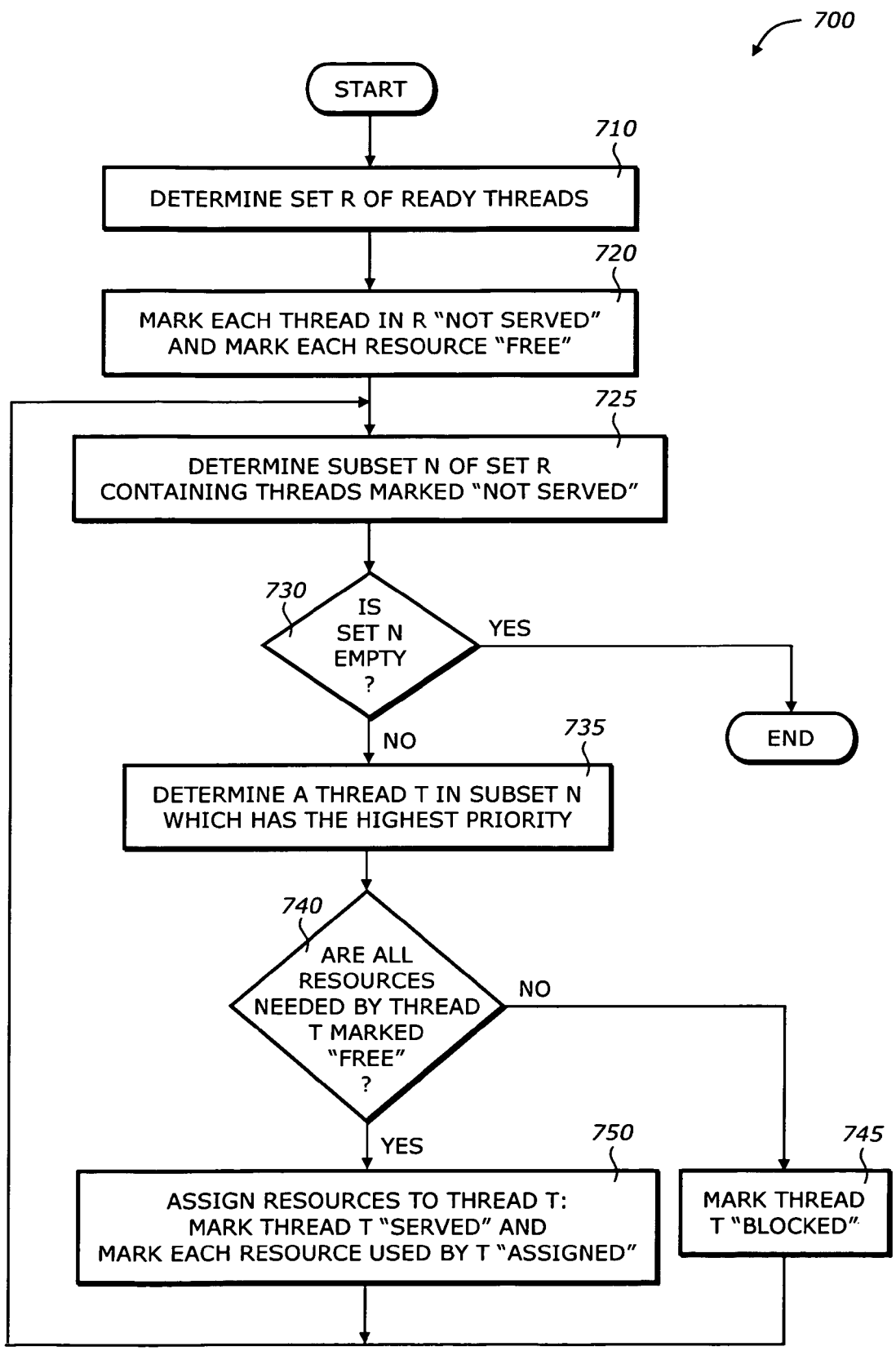
FIG. 7 is a flowchart illustrating a process describing operation of priority selection according to one embodiment of the invention.

FIG. 7 is a flowchart illustrating a process 700 describing operation of priority selection according to one embodiment of the invention.

Upon START, the process 700 determines a set R of threads that are ready to execute (Block 710). The set R contains each thread for which a request is present, that is, one of the instruction registers holds an instruction from the thread. Next, the process 700 marks or tags the thread state for each thread "not served". This includes all threads that were marked "blocked" in the previous assignment cycle. The process 700 also marks each resource "free" (Block 720).

Next, the process 700 proceeds through repeated execution of blocks 725, 730, 735, 740, 745, and 750 until the exit condition is met at block 730. The process 700 determines a subset N of the set R containing threads that are marked "not served" (Block 725). Next, the process 700 determines if the subset N is empty, i.e., if all threads in N have been processed (Block 730). If so, the process 700 is terminated. Otherwise, the process 600 determines a thread T that has the highest priority among the threads in subset N by examining the priority code (Block 635). Next, the process 700 determines if all resources needed by the thread T are marked "free" (Block 740). If not, the process 700 marks the thread T "blocked" and then goes back to block 725 (Block 745). Otherwise, the process 700 assigns the requested resources to thread T, marks thread T "served", and marks each resource assigned to or used by thread T "assigned" (Block 750). Then, the process 700 goes back to block 725.

In essence, in each traverse of the repeated blocks of the process 700, one thread is removed from the subset N of threads marked "not served". Therefore, the process 700 ends with no more than P repetitions of the set of repeated blocks. In each repetition, the highest priority thread in the subset N is considered, and it is assigned resource(s) if the resource(s) is marked "free". If so, the assigned resources are marked "assigned" and the thread is marked "served". Otherwise, the thread is marked "blocked". In both cases, the thread is no longer in the subset N.

When the process 700 ends, several threads may have been assigned resources, and the execution of one or more instructions may be initiated. However, no resource is assigned to a thread if it could have been used by a thread having higher priority. In this way, preference is given to threads having higher priority in dispatching instructions to execution units of the slice. Similarly, the instruction fetch unit 412 and the memory access unit 460 may include priority selector units that employ the process 700 to assign instruction fetch or memory access resources to requesting threads.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a processor capable of simultaneous execution of two or more threads of instructions, wherein the processor comprises:
    at least two resource units, each capable of being assigned to an instruction of each of the threads, wherein each of the resource units is configured to implement only a subset of instruction types of an instruction set;
    a priority register to store thread information for the threads, the thread information including a priority code corresponding to the instructions of each thread, at least one of the threads requesting use of one of the resource units for processing a current instruction; and
    a priority selector coupled to the priority register to generate an assignment signal to assign the resource units to the requesting thread's current instruction according to the priority codes.

2. The apparatus of claim 1 wherein each of the resource units is one of an instruction fetch unit, a memory locking unit, a load unit, a store unit, an input/output unit, a peripheral unit interface, and a functional unit.

3. The apparatus of claim 2 wherein the functional unit is one of an arithmetic unit, a logic unit, and an arithmetic and logic unit.

4. The apparatus of claim 1 further comprising:
    an instruction multiplexer coupled to the priority selector to pass instructions stored in a plurality of instruction registers to execution units according to the assignment signal.

5. The apparatus of claim 1 further comprising:
    a priority assignor coupled to the priority register to set the thread information including at least one of the priority codes corresponding to the instructions of each thread in response to a start instruction from an instruction decoder and dispatcher.

6. The apparatus of claim 5 wherein the priority assignor is configured to set an active flag in the priority register corresponding to at least one of the threads in response to the start instruction.

7. The apparatus of claim 6 wherein the priority assignor is configured to reset the active flag in the priority register corresponding to at least one of the threads in response to a quit instruction from the instruction decoder and dispatcher.

8. The apparatus of claim 1 wherein the priority selector is configured to assign one of the resource units to the instructions of one of the threads if the one of the threads is not served and the one of the resource units is free.

9. The apparatus of claim 8 wherein the one of the threads has highest priority code among a set of ready threads.

10. The apparatus of claim 8 wherein the priority selector is configured to iteratively assign resource units to instructions of threads in the set of ready threads according to the corresponding priority codes and resource availability until the set becomes empty.

11. A method comprising:
executing two or more threads of instructions simultaneously in a processor;
storing thread information for the threads, the thread information including a priority code corresponding to instructions of each thread, at least one of the threads requesting use of one of at least two resource units capable of being assigned to an instruction of each of the threads for processing a current instruction, wherein each of the resource units implements only a subset of instruction types of an instruction set; and
generating an assignment signal to assign the resource units to the requesting thread's current instruction according to the priority codes.

12. The method of claim 11 wherein each of the resource units is one of an instruction fetch unit, a memory locking unit, a load unit, a store unit, an input/output unit, a peripheral unit interface, and a functional unit.

13. The method of claim 12 wherein the functional unit is one of an arithmetic unit, a logic unit, and an arithmetic and logic unit.

14. The method of claim 11 further comprising:
passing instructions stored in a plurality of instruction registers to execution units according to the assignment signal.

15. The method of claim 11 further comprising:
setting the thread information including at least one of the priority codes corresponding to the instructions of each thread in response to a start instruction from an instruction decoder and dispatcher.

16. The method of claim 15 wherein setting the thread information comprises setting an active flag in the priority register corresponding to at least one of the threads in response to the start instruction.

17. The method of claim 16 wherein setting the thread information comprises resetting the active flag in the priority register corresponding to at least one of the threads in response to a quit instruction from the instruction decoder and dispatcher.

18. The method of claim 11 wherein generating the assignment signal comprises generating the assignment signal to assign one of the resource units to the instructions of one of the threads if the one of the threads is not served and the one of the resource units is free.

19. The method of claim 18 wherein the one of the threads has highest priority code among a set of ready threads.

20. The method of claim 1 wherein generating the assignment signal comprises iteratively assigning resource units to instructions of threads in the set of ready threads according to the corresponding priority codes and resource availability until the set becomes empty.

21. A processor capable of simultaneous execution of two or more threads of instructions, comprising:
at least two resource units to provide resources for use by the threads, each capable of being assigned to an instruction of each of the threads, wherein each of the resource units is configured to implement only a subset of instruction types of an instruction set;
a resource prioritizer coupled to each of the resource units to prioritize resource utilization, the resource prioritizer comprising:
a priority register to store thread information for the threads, the thread information including a priority code corresponding to the instructions of each thread, at least one of the threads requesting use of one of the resource units for processing a current instruction, and
a priority selector coupled to the priority register to generate an assignment signal to assign the resource units to the requesting thread's current instruction according to the priority codes.

22. The processor of claim 21 wherein each of the resource units is one of an instruction fetch unit, a memory locking unit, a load unit, a store unit, an input/output unit, a peripheral unit interface, and a functional unit.

23. The processor of claim 22 wherein the functional unit is one of an arithmetic unit, a logic unit, and an arithmetic and logic unit.

24. The processor of claim 21 the resource prioritizer further comprising:
an instruction multiplexer coupled to the priority selector to pass instructions stored in a plurality of instruction registers to execution units according to the assignment signal.

25. The processor of claim 21 the resource prioritizer further comprising:
a priority assignor coupled to the priority register to set the thread information including at least one of the priority codes corresponding to the instructions of each thread in response to a start instruction from an instruction decoder and dispatcher.

26. The processor of claim 25 wherein the priority assignor is configured to set an active flag in the priority register corresponding to at least one of the threads in response to the start instruction.

27. The processor of claim 26 wherein the priority assignor is configured to reset the active flag in the priority register corresponding to at least one of the threads in response to a quit instruction from the instruction decoder and dispatcher.

28. The processor of claim 21 wherein the priority selector is configured to assign one of the resource units to the instructions of one of the threads if the one of the threads is not served and the one of the resource units is free.

29. The processor of claim 28 wherein the one of the threads has highest priority code among a set of ready threads.

30. The processor of claim 28 wherein the priority selector is configured to iteratively assign resource units to instructions of threads in the set of ready threads according to the corresponding priority codes and resource availability until the set becomes empty.

* * * * *